United States Patent [19]

Foucher et al.

[11] 4,421,425

[45] Dec. 20, 1983

[54] FIXED FAD THRUST BEARING

[75] Inventors: Gérard Foucher, Tremblay les Gonesse; Michel Hermand, Le Blanc Mesnil, both of France

[73] Assignee: Alsthom-Atlantique, Paris, France

[21] Appl. No.: 379,198

[22] Filed: May 17, 1982

[30] Foreign Application Priority Data

May 15, 1981 [FR] France ................................ 81 09706

[51] Int. Cl.³ ........................ F16C 17/04; F16C 27/02
[52] U.S. Cl. .................................... 384/123; 384/124; 384/223; 384/307
[58] Field of Search ............... 384/111, 112, 121, 123, 384/307, 124, 305, 223, 368, 420, 118, 125, 119, 215, 369

[56] References Cited

U.S. PATENT DOCUMENTS

| | | | |
|---|---|---|---|
| 1,436,265 | 11/1922 | Kingsbury et al. | 384/305 |
| 2,731,308 | 1/1956 | Willneck | 384/291 |
| 3,893,737 | 7/1975 | Tyson | 384/307 |
| 3,966,279 | 6/1976 | Raimondi | 384/124 |
| 3,982,796 | 9/1976 | Hill | 384/307 |
| 4,277,112 | 7/1981 | Heshmat | 384/124 |

FOREIGN PATENT DOCUMENTS

| | | |
|---|---|---|
| 3025876 | 2/1981 | Fed. Rep. of Germany . |
| 103867 | 2/1917 | United Kingdom . |
| 843021 | 8/1960 | United Kingdom . |
| 1392245 | 4/1975 | United Kingdom . |

Primary Examiner—John M. Jillions
Assistant Examiner—David J. Werner
Attorney, Agent, or Firm—Donald E. Zinn

[57] ABSTRACT

A fixed pad thrust bearing for a turbomachine comprises a ring of sector-shaped pads separated by grooves and facing a thrust collar integral with the rotor of the turbomachine within a thrust bearing cage integral with the rotor. The ring bears on a deformable ring. Each pad is fed with oil via a space formed in the wall of the cage and facing an orifice in a bore in the pad. A front surface of each pad facing the collar is inclined relative to the rear surface of the ring. Each pad is further formed with a groove communicating with the aforementioned bore but not reaching as far as the inner and outer edges of the pad, being disposed adjacent the leading edge of the pad. The oil is recovered centrifugally from the outer edge of the collar. In this way, virtually all the power consumed by the oil goes towards providing the hydrodynamic supporting force, minimizing the shearing losses between the fixed and moving parts within the thrust bearing cage.

3 Claims, 3 Drawing Figures

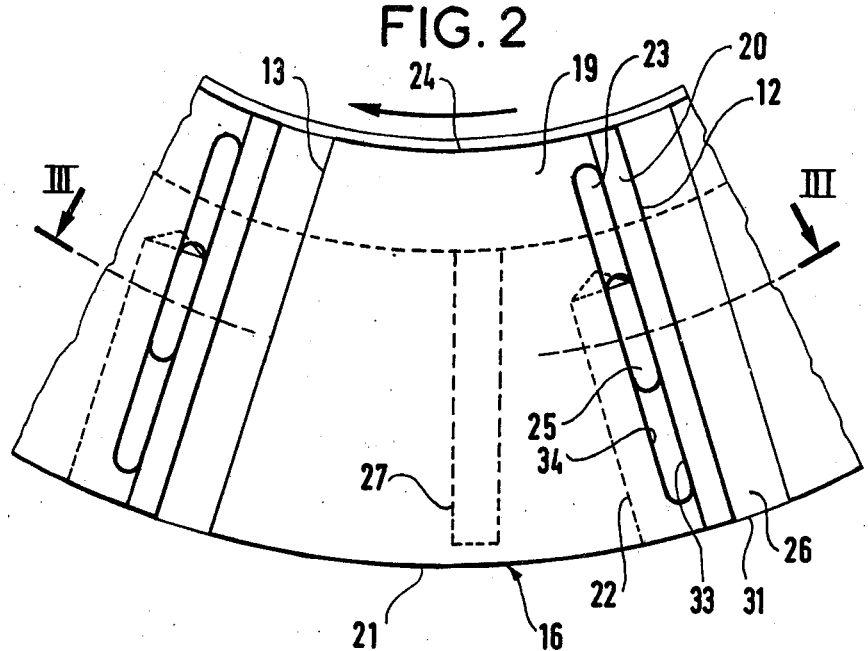
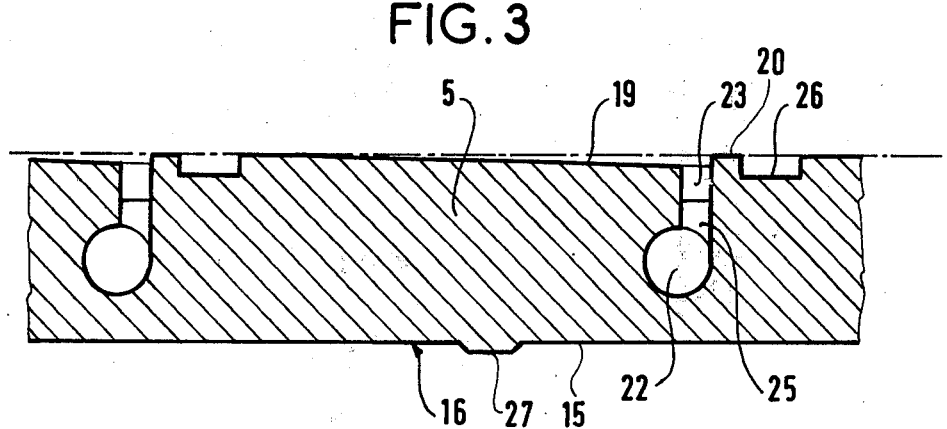

FIXED PAD THRUST BEARING

BACKGROUND OF THE INVENTION

1. Field of the Invention

The present invention concerns a fixed pad thrust bearing for a turbomachine.

2. Description of the Prior Art

In known fixed pad thrust bearings oil is injected along the rotor and under the effect of pressure the oil is forced into blind grooves at the outer edges of the pads so that the oil circulates along the front surface of the pads to form a wedge-shaped oil film.

In known thrust bearings in which splash lubrication is effected by pressurizing the oil, the oil is subjected to shearing forces between the fixed part (the thrust bearing cage) and the moving part, this representing a significant power loss.

SUMMARY OF THE INVENTION

The invention consists in a fixed pad thrust bearing for a turbomachine, comprising a thrust collar integral with a rotor of said turbomachine, a ring comprising two parts of equal size formed with fixed sector-shaped pads separated by radial grooves and disposed around said rotor, deformable means on which a rear surface of said ring bears, a fixed cage containing said ring and said deformable means, oil feed means discharging into said fixed cage, and an annular oil recovery chamber whence oil is evacuated by gravity through one or more passages in the lower part of said fixed cage, wherein each pad is delimited by first and second lateral edges, said first lateral edge being in advance of said second lateral edge in the direction of rotation of said collar, each pad has a front surface facing said collar and an outer edge facing a wall of said cage, each pad has in its front surface an opening adjacent said first lateral edge, which is delimited by first and second inner edges, which does not extend so far as the inner and outer edges of the pad and which is fed by a passage in the pad discharging through an orifice in its outer edge, said front surface of each pad diverges from said rear surface of said ring in the direction away from said first inner edge, said grooves extend completely across said ring, and said wall of said cage facing said orifice in said outer edge of each pad incorporates a space to which oil is fed by said oil feed means, whereby the aforementioned power loss is reduced.

The advantages of the thrust bearing in accordance with the invention are due to the fact that there is no splashing of the oil in the thrust bearing because the oil is not injected between the fixed and moving parts, at which point the oil has no function, but instead adjacent the first lateral edge of each pad where it has an active role in creating an oil film between the pads and the thrust collar. Furthermore, by virtue of the grooves some of the hot oil, which has accomplished its task, may be evacuated.

In accordance with a further feature of the invention, the thrust bearing comprises sealing means between said outer edges of said pads and said wall of said cage, preventing oil from said oil feed circuit leaking towards said rear surface of said ring or towards said grooves and said front surface of said pads, so limiting oil consumption. In a particularly simple embodiment, said sealing means comprise two thread-like seals surrounding said ring, one on each side of said orifices in said outer edges of said parts.

The invention will now be described in more detail with reference to a specific embodiment disclosed by way of example only and shown in the accompanying drawings.

BRIEF DESCRIPTION OF THE DRAWINGS

FIG. 2 is a front view of part of the ring of pads in accordance with the invention.

FIG. 3 is a developed cross-section through the ring of pads in FIG. 2, along arcuate line III—III.

DESCRIPTION OF THE PREFERRED EMBODIMENT

Figure 1:
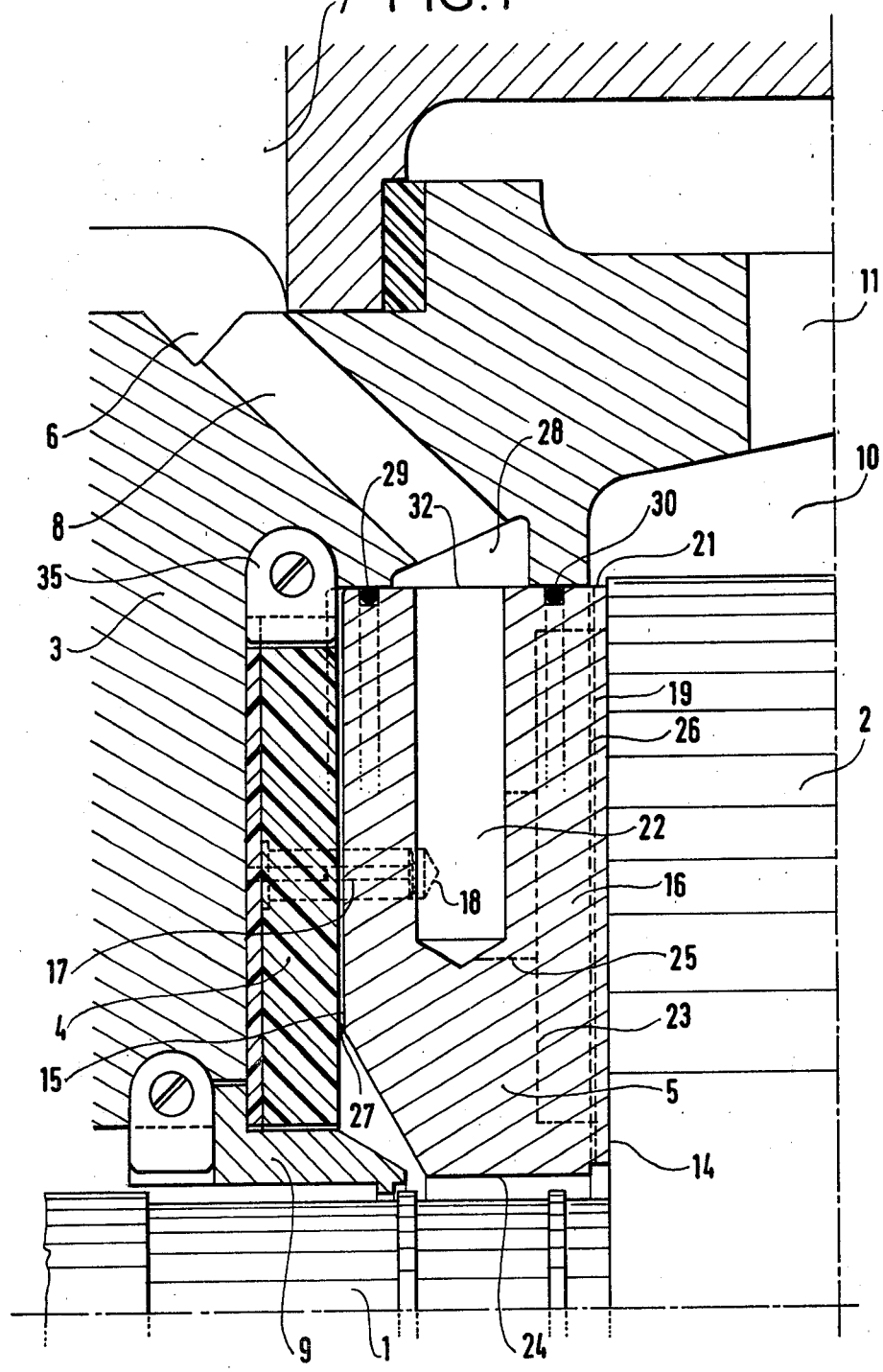
FIG. 1 shows a thrust bearing in accordance with the invention.

FIG. 1 is a cross-section through the axis of the thrust bearing in accordance with the invention. The shaft 1 of the turbine comprises a thrust collar 2. The stator of the turbine comprises a thrust bearing cage 3 disposed around collar 2 and containing an elastic ring 4 lining the side of the thrust bearing cage opposite collar 2 and a ring 16 incorporating a number of sector-shaped pads 5 separated by radial grooves 26 formed in said ring 16, extending across the full width of ring 16.

Within the stator there is an annular oil feed chamber 6 into which an oil feed line 7 discharges. Passages 8 connect chamber 6 with the inside of thrust-bearing cage 3.

A seal 9 is provided between shaft 1 and thrust bearing cage 3 so that oil cannot leak along shaft 1, thereby limiting shear stresses on the oil between shaft 1 and thrust bearing cage 3.

Around the perimeter of collar 2 is an annular oil recovery space 10, oil being evacuated by gravity through one or more passages 11 in the lower part of cage 3.

Referring to FIG. 2, each pad 5 has a first, leading lateral edge 12 and a second trailing lateral edge 13, the latter trailing first lateral edge 12 in the direction of rotation of shaft 1 and collar 2. Grooves 26 are delimited by the second lateral edge 13 of one pad 5 and the first lateral edge 12 of the next following pad 5. Onto the outer edge 21 of each pad there discharges oil from a radial bore 22.

Bore 22 feeds oil to a groove 23 machined in front surface 14 and extending along a radius from a point adjacent the outer edge 21 of the pad to a point adjacent the inner edge 24 of the pad, close to first lateral edge 12 of said pad.

Groove 23 is delimited by a first, leading inner edge 33 and a second trailing inner edge 34, the latter trailing first inner edge 33 in the direction of rotation of shaft 1 and collar 2.

Between bore 22 and groove 23 is a wide passage 25 discharging into groove 23.

Front surface 14 of each pad 5 faces collar 2 and incorporates a first plane surface 20 parallel to rear surface 15 of ring 16 extending from first lateral edge 12 to inner edge 33.

A second plane surface 19 diverges from rear surface 15 of ring 16 in the direction from first inner edge 33 to second lateral edge 13.

Rear surface 15 of ring 16 bears on elastic ring 4 via shallow bosses 27 formed on it.

Fixed to ring 4 are pivot pins 17 each of which penetrates into a cylindrical bore 18 parallel to the axis of the turbomachine in rear surface 15 of ring 16 in line with each pad 5 and preventing rotation of ring 16 relative to elastic ring 4 which is itself keyed against rotation relative to thrust bearing cage 3 by a stop 35. Thus the effect of the oil pressure is to move ring 16 away from collar 2, guided by pivot pins 17 which remain in their respective bores 18.

Outer edge 21 of each pad 5 comes into contact with the inner wall of cage 3.

Each passage 8 terminates in a space 28 formed in cage 3 facing orifice 32 of a respective bore 22. A first thread-like seal 29 runs around the ring so as to constitute a torus in the vicinity of rear surface 15 to form a seal between outer edge 21 of pads 5 and the wall of cage 3, to prevent oil leaking from spaces 28 towards rear surface 15. A second thread-like seal 30 runs around ring 6 in the vicinity of the bottoms 31 of grooves 26, forming a seal between outer edge 21 of pads 5 and the wall of cage 3 to prevent oil leaking from spaces 28 towards grooves 26.

When pads 5 are fed with cold oil, the oil sprays through grooves 23 facing collar 2.

Due to centrifugal effects, the oil collects in annular space 10 whence it is evacuated by gravity through one or more passages 11 in the lower part of cage 3.

By virtue of the use of the invention, the cold oil is introduced directly beneath pads 5 without previously being subjected to significant shearing stresses between two surfaces in relative movement, especially in the vicinity of the rotor.

The major part of the power consumed by the oil thus contributes to generating the hydrodynamic supporting force.

It will be appreciated that collar 2 could comprise, on the side opposite that shown, a thrust bearing symmetrical so that shown relative to a plane perpendicular to the axis, in which case a common annular space 10 could serve to recover the oil from both bearings.

The single groove 23 could be replaced with a series of circular openings disposed along a line in the vicinity of first lateral edge 12.

We claim:

1. A fixed pad thrust bearing for a turbomachine, said turbomachine comprising a rotor, a stator surrounding said rotor, said thrust bearing comprising a thurst collar integral with said rotor, a ring having radial grooves defining fixed sector-shaped pads disposed at various points around said rotor, deformable means on which a rear surface of said ring bears at various points, said stator comprising a fixed cage containing said ring and said deformable means, oil feed means discharging into said fixed cage, and an annular oil recovery chamber, one or more passages in the lower part of said fixed cage, whence oil is evacuated by gravity, and wherein each pad is delimited by first and second lateral edges, said first lateral edge being in advance of said second lateral edge in the direction of rotation of said collar, each pad having a front surface facing said collar and an outer edge facing a wall of said cage, each pad having in its front surface an opening adjacent said first lateral edge, which is delimited by first and second inner edges, said opening terminating radially short of the inner and outer edges of the pad, and a passage in the pad receiving oil charging through an orifice in its outer edge and feeding said opening, said front surface of each pad diverging from said rear surface of said ring in the direction away from said first inner edge, said grooves extending completely across said ring, and said wall of said cage facing said orifice in said outer edge of each pad incorporating a space to which oil is fed by said oil feed means.

2. A thrust bearing according to claim 1, comprising sealing means between said outer edges of said pads and said wall of said cage, preventing oil reaching said spaces leaking towards said rear surface of said ring or towards said grooves and said front surfaces of said pads.

3. A thrust bearing according to claim 2, wherein said sealing means comprise two thread-like seals surrounding said ring, one of each side of said orifices.

* * * * *